3,510,151
LATCH FOR A THREE-POINT SAFETY BELT FOR MOTOR VEHICLES

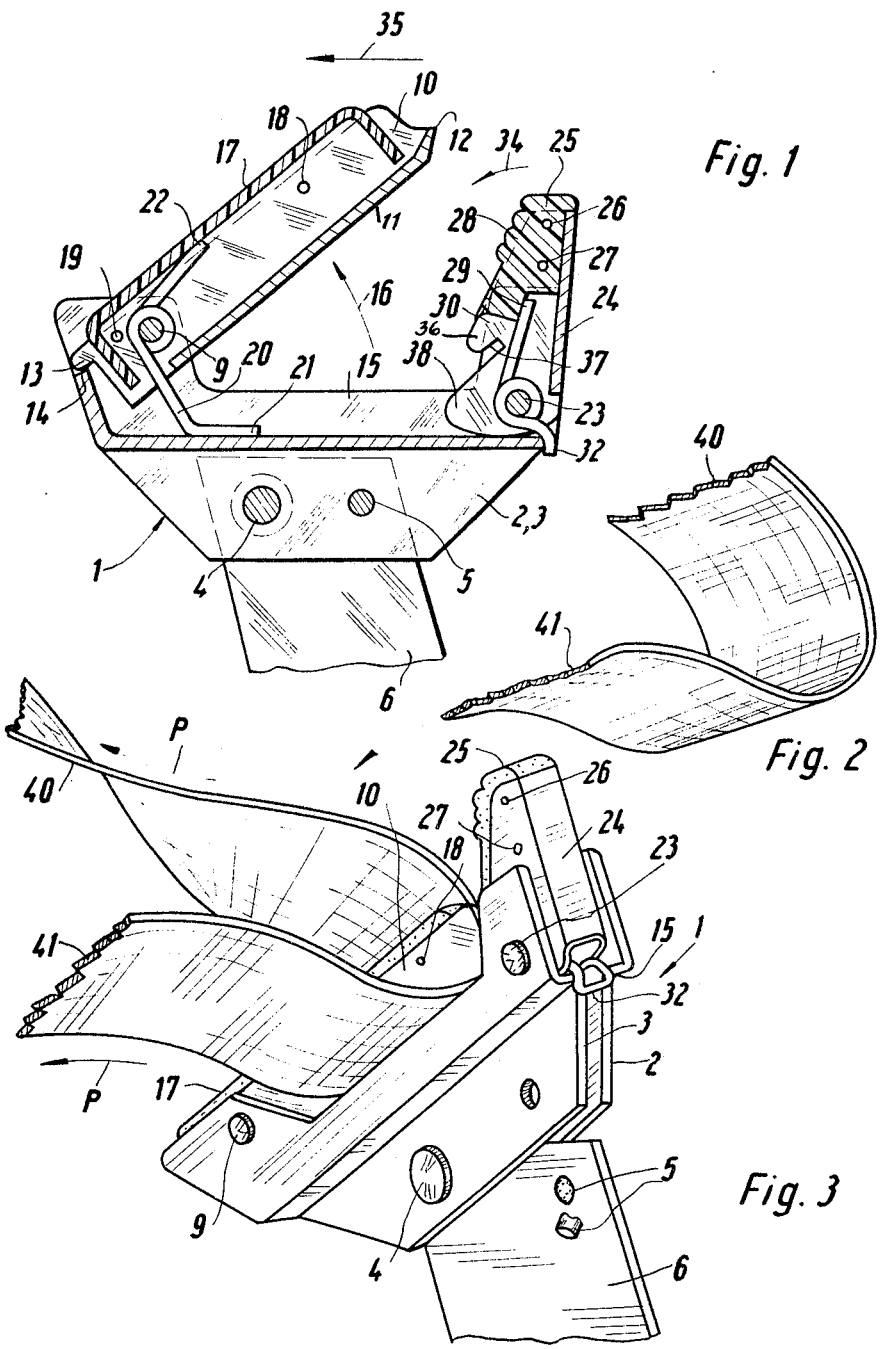

Per Olaf Weman, Hamburg-Garstedt, Germany, assignor to Sigmatex AG, Basel, Switzerland, a firm
Filed Dec. 1, 1967, Ser. No. 687,354
Int. Cl. B60r 21/10; A62b 35/00
U.S. Cl. 280—150                                     11 Claims

ABSTRACT OF THE DISCLOSURE

This invention provides a latch in which a loop to be formed by the user between the lap-strap section and the shoulder-strap section of a three-point safety belt is engageable. One end of the safety belt is passed through a reel on the doorpost and descends to a solid anchoring on the floor panel and the other end is mounted in a belt winder on the side wall adjacent the floor panel. The latch is mounted on a steel strip fastened to the motor vehicle floor panel and comprises a pivotable spring-loaded shackle for engaging the loop of the safety belt and a spring-loaded locking lever for locking said shackle.

BACKGROUND OF THE INVENTION

This invention relates to a latch for a three-point safety belt for motor vehicles.

With three-point safety belts consisting of a shoulder strap and a lap strap, it has been the practice to fasten these belt sections on the side of the seat remote from the vehicle door to a coupling fixture by means of a buckle anchored on the vehicle floor panel. Such arrangements have the defect that the buckle can rub on the seat and abrade the seat-cover material. And when such a three-point safety belt is equipped with an automatic belt winder, as is often the case, there is the further disadvantage that, as the belt is disconnected or the buckle is uncoupled, the buckle can injure the user as a result of its drawing force when it is snapped back by the belt winder. A feature recognized as especially dangerous, particularly in the case of an accident, is that, when one or more belt sections are provided with relatively heavy fastening hardware, this hardware, even when the safety belts are not in use, can injure the occupants.

SUMMARY OF THE INVENTION

It is the object of this invention to provide a latch for a three-point safety belt which does not have heavy fastening hardware that represents a danger of injury to the user. In addition to this, the latch should be constructed in such a manner that it can be operated with one hand so that the driver can connect up the three-point safety belt even when he is driving. And finally, the latch should be so designed that it cannot abrade the seat-cover material of the motor vehicle.

To attain this object, the present invention provides a latch for a three-point safety belt for motor vehicles which comprises a spring-loaded shackle which can be moved from an open position into a locked position thereby securing a section of said three-point safety belt looped around the open shackle by a user, a locking lever for securing said shackle in said locked position, and a steel strip between a vehicle floor panel and said latch, serving as a mounting for said latch.

This arrangement eliminates the necessity of mounting fastening hardware on the belt, since the belt can be fastened by looping it around the solidly mounted shackle and then can be locked in place by closing the shackle. If, for example, one end of the safety belt is provided with a belt winder mounted on the vehicle side wall adjacent the floor panel, and the other end of the belt is led around a reel high on the same side of the vehicle, then descends to a point on the floor panel where it is firmly anchored, the user need only draw a section of the safety belt from the belt winder transversely across his upper body, lay a loop around the opened shackle and then, all with the same hand, push the shackle down into its locked position. When the safety belt is subsequently disconnected from the shackle, the latch with its shackle remains in position, and only the belt sections are drawn back by the belt winder so that any injuries to the occupants are excluded. Also when the safety belt is not in use, injuries cannot be caused by the fastening hardware in the case of an accident, since the only fastening hardware employed is mounted out of harm's way between the two front seats of the motor vehicle.

In order to simplify the manipulation of the latch proposed by the invention, the shackle and the locking lever may be pivoted on a latch body mounted on the steel strip.

It is additionally advantageous if the shackle is pivoted on the forward end, relative to the direction of travel of the vehicle, of the latch body and can pivot counterclockwise from the locked position into the open position, and the locking lever is pivoted on the rear portion of the latch body, relative to the direction of travel of the vehicle. This arrangement is advantageous in that during an accident a sliding of the safety belt forward inside its latch is to be reckoned with. Nonetheless, such a sliding has no bearing on the locking characteristics and cannot cause the latch to spring open as long as the locking lever is mounted towards the back.

One-hand use of the latch is further facilitated if the locking lever is provided with a spring for holding it in the locked position and is piovted by the shackle as this shackle descends into the locked position against the force of said spring. Herewith, the locking lever is provided with an oblique nose terminating on its underside in a groove pointing downwards which engages the shackle when this shackle is in the locked position. In this manner, once the loop of the belt is laid around the open shackle, one need only press the shackle down against the force of its spring so far that it moves the locking lever back as it strikes its oblique nose until this locking lever snaps back under the force of its spring into the locked position whereby the shackle and also the belt are firmly held. Disconnecting the three-point safety belt from the latch with one hand is further facilitated in that the locking lever is provided with a handle which projects above the shackle when this shackle is in the locked position.

An effortless manipulation and a good seating of the belt sections are most likely if the shackle lies substantially horizontal when it is in its locked position. It still appears that a disadvantage of this arrangement is that, in case of an accident, the safety belt which is suddenly heavily strained moves forward under the shackle and burdens almost exclusively the pivot point of the shackle or gets tightly bunched up in the front part of the latch, without spreading the strain across the whole width of the shackle and thereby putting the same strain on the front and back parts of the latch, that is, on the pivot of the shackle as well as that of the locking lever. In order to do this, the invention provides that the latch body is secured on the steel strip by means of a pivot pin on the forward end of the latch body relative to the direction of travel of the vehicle, and by a weaker shearing pin arranged behind said pivot pin. Such an arrangement entails that when the three-point safety belt is suddenly, heavily strained, as is particularly the case during an accident, the shearing pin ruptures and the latch turns so far on its axis that the three-point safety belt presses against the shackle with its whole width, and the force is born equally on the two ends of the latch.

3

BRIEF DESCRIPTION OF THE DRAWINGS

An embodiment of the invention will now be described by way of example and with reference to the accompanying drawings, in which:

FIGS. 1 and 3 show a latch which possesses a latch latch according to the invention;

FIG. 2 is a perspectve view of a loop of a three-point safety belt;

FIG. 3 is a perspective view of the latch of FIG. 1 in locked position, and

DESCRIPTION OF THE PREFERRED EMBODIMENT

Figure 4:
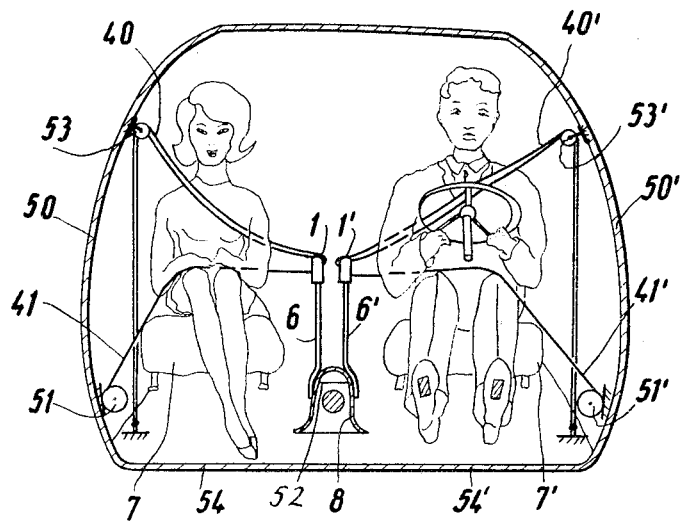
FIG. 4 is a schematic representation of the latch connected with a three-point safety belt.

FIGS 1 and 3 show a latch which possesses a latch body 1 consisting of two outwardly offset steel side plates 2 and 3 which are mounted on a steel strip 6 by means of a pivot pin 4 as well as a shearing pin 6. As seen in FIG. 4, the steel strip 6 is anchored next to the seats 7 of a vehicle on the propeller shaft tunnel 8 of the vehicle.

Relative to the direction of travel of the vehicle as indicated by the arrow 35 in FIG. 1, the forward ends of the outwardly offset steel side plates 2 and 3 have a pivot pin 9 mounted between them on which pivot pin 9 a shackle 10 can turn. The shackle 10 consists of a piece of steel bent so as to have a substantially U-shaped cross section and a rounded web 11. The rear end of the rounded web 11 is bent up to form a pointed catch edge 12. The forward end of each lateral wing of the shackle 10 has a nose 13 adapted to come to rest against the upper surface 14 of the shoulder portion 15 of the outwardly offset steel side plates 2 and 3 in order to limit the swing movement of the shackle 10 in the direction of the arrow 16 in FIG. 1.

A troughlike cap 17 made of plastics material is set in the shackle 10 from above and held in place therein by two pins 18 and 19. A spring 20 fits on the pivot pin 9 for the shackle 10 in such a manner that its legs 21 and 22 press against the shoulder portion 15 and against the underside of the troughlike cap 17, respectively, so that the shackle 10, forced by the spring 20 in the direction indicated by the arrow 16, is swung into and held in the open position shown in FIG. 1.

A locking lever 24 is fixed on a pivot pin 23 which in turn is fixed on the rear end of the latch body 1 between the outwardly offset steel side plates 2 and 3. This locking lever 24 consists of a U-shaped piece of steel provided with a plastics handle 25 inserted into its upper portion and secured thereto by means of two pins 26 and 27. The plastics handle 25 is provided with flutings on its forward side and on its underside with a projection 29 serving as an abutment for the upper leg 30 of a spring 30, 32 which spring 30, 32 is fitted on the pivot pin 23 and engages with its lower leg 32 behind the rear edge of the shoulder portion 15 so that the locking lever 24 with its plastics handle 25 is urged forward, i.e. in the direction of the arrow 34 in FIG. 1 and thus in the direction of travel of the vehicle.

The forward side of the locking lever 24 has in its middle portion an oblique nose 36 which terminates on its underside in a groove 37 functioning as a catch. This groove 37 has the same upwardly directed oblique angle as the pointed catch edge 12 of the shackle 10 when this shackle 10 is closed and locked as seen in FIG. 3. The lower face of a supporting segment 38 below the groove 37 in the locking lever 24 limits the extent of forward swing of the locking lever 24 under the action of the spring 30, 32.

The latch shown in the drawings operates in the following manner:

To connect up the three-point safety belt, the loop to be formed at the transition point between the shoulder strap 40 and the lap strap 41 (FIG. 4) is laid around the shackle 10 when the latter is in its open position shown in FIG. 1. Subsequently, the user pushes the shackle 10 down with his finger against the action of the spring 20. During the downward movement, the pointed catch edge 12 of the shackle 10 strikes the oblique nose 36 forcing the locking lever 24 to move in a clockwise direction against the pressure of the spring 30, 32 until the catch edge 12 engages in the groove 37. At the moment of engagement, the locking lever 24 snaps back under the force of the spring 30, 32 into its locking position and holds the shackle 10 locked by means of the groove 37. In order to disconnect the three-point safety belt from the latch, the locking lever 24 need only be drawn back by the user so that the groove 37 disengagse the pointed catch edge 12 and the shackle 10 is swung into its open position by the action of the spring 20.

When an accident occurs and the safety belt pulls heavily on the latch, the shearing pin 5 ruptures and the whole latch with its plates 2 and 3 swings with the shackle 10 and the locking arm 24 around the pivot pin 4 as far in the clockwise direction as is shown in FIG. 3. In this position, the pull P is distributed on the shackle 10 across the whole width of the three-point safety belt so that the pivot pins 9 and 23 are equally strained.

FIG. 4 shows the arrangement of two three-point safety belts 40, 41 and 40', 41' with their respective automatic belt winders 51, and 51' in a motor vehicle. With this arrangement, the automatic belt winders 51 and 51' from which the lap straps 41 and 41' are led to the latches with the latch bodies 1 and 1' respectively are arranged at the foot of the respective doorposts 50 and 50' of the motor vehicle. A bolt 52 on the propeller shaft tunnel 8 of the motor vehicle holds the steel strips 6 and 6' for the latch bodies 1 and 1' for the safety belts of the passenger and the driver, respectively. The lap straps 41 and 41' are led as loops through the latch bodies 1 and 1' respectively and led as shoulder straps 40 and 40' over the shoulder of the respective motor-vehicle occupant to respective reels 53 and 53' from where they descend to solid anchorings on the vehicle floor planes 54 and 54', respectively.

To connect up such a three-point safety belt, the occupant need only grasp the loop portion of the belt from adjacent the windows on the vehicle and draw it to the respective latch body 1 or 1' which is in the open position shown in FIG. 1, then lay the loop portion between the lap strap and the shoulder strap around the shackle 10 and press the latter down into the locked position and in FIG. 3. To later disconnect the three-point safety belt, one need only draw back the locking lever 24 on the latch body 1 or 1'. The belt winder 51 or 51' then winds up the respective safety belt so that in the end only two belt sections stretch between the reel 53 or 53' and the respective vehicle floor panel 54 or 54' and the belt winder 51 or 51', respectively.

What is claimed is:

1. The combination of a three-point safety belt and a latch for motor vehicles comprising a continuous lap and shoulder belt, a latch body, shackle means carried by said latch body for clampingly securing a loop section of said belt between said shackle means and said latch body when said shackle means is in a closed position thereof, a pivot pin mounting said shackle means for pivotal movement between an open position and said closed position, means for securing said shackle means in said closed position, and said pivot pin having an axis generally parallel to the longitudinal axis of the portion of the loop section held between said shackle means and said body in said closed position.

2. The latch as defined in claim 1 including strip means for supporting said latch body in an elevated position relative to a vehicle floor panel.

3. The latch as defined in claim 1 wherein said latch body includes forward and rearward ends relative to the direction of travel of a vehicle, and said pivot pin is at said forward end of said latch body whereby said shackle means is moved in the driection of vehicle travel from said closed to said open position.

4. The latch as defined in claim 3 wherein said securing means includes a locking lever, and pivot means pivotally mounting said locking lever on the rearward end of said latch body.

5. The latch as defined in claim 4 including spring means for biasing said locking lever toward a locked position, and said shackle means includes means for pivoting said locking lever against the bias of said spring means during the movement of said shackle means to said closed position.

6. The latch as defined in claim 4 wherein said locking lever includes an oblique nose terminating on its underside in a groove opening toward said body, and an end of said shackle means remote from the pivot pin thereof engages in said groove in said closed position.

7. The latch as defined in claim 1 including a strip between a vehicle floor panel and said latch body serving as a mounting for said latch, said latch body being secured to said strip by means of a pivot pin on a forward end of said latch body relative to the direction of travel of the vehicle, and by a weaker shearing pin arranged behind said pivot pin.

8. The latch as defined in claim 1 wherein said latch body includes means for pivotally securing said latch body to a support member for pivotal movement of said latch body about an axis normal to the direction of vehicle travel.

9. The latch as defined in claim 8 wherein said pivotal securing means and said pivot pin have generally parallel axes.

10. The latch as defined in claim 9 wherein said latch body includes forward and rearward ends relative to the direction of travel of a vehicle, and said pivotal securing means is at said forward end of said latch body.

11. The latch as defined in claim 10 including means at said rearward end of said latch body for securing the latter to a support member by shear pin means.

References Cited

UNITED STATES PATENTS

| 2,271,133 | 1/1942 | Thoresen | 24—170 |
| 3,378,301 | 4/1968 | Romanzi et al. | 297—389 |
| 3,348,881 | 10/1967 | Weman | 297—388 |
| 2,954,594 | 10/1960 | Finken | 24—170 |
| 3,420,573 | 1/1969 | Holmberg | 297—389 |

FOREIGN PATENTS

| 636,092 | 3/1962 | Italy. |

LEO FRIAGLIA, Primary Examiner

L. J. PAPERNER, Assistant Examiner

U.S. Cl. X.R.

24—170, 191, 248; 297—389